July 8, 1924.
M. CASTRICUM
WEIGHING MOVING MATERIAL
Filed Oct. 30, 1922
1,500,233
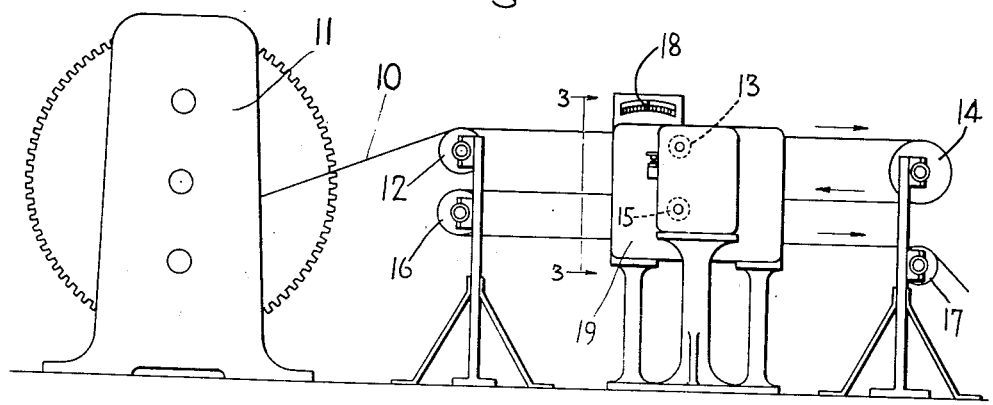
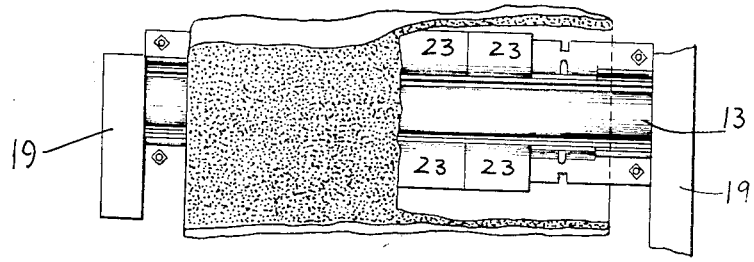
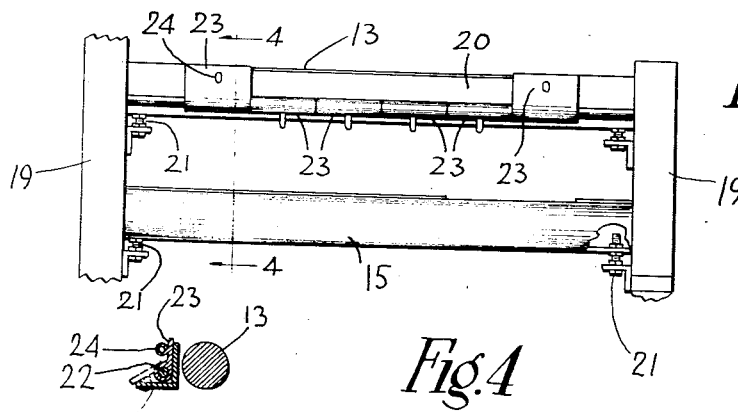
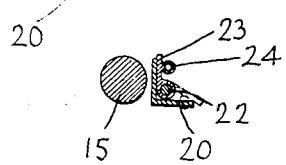
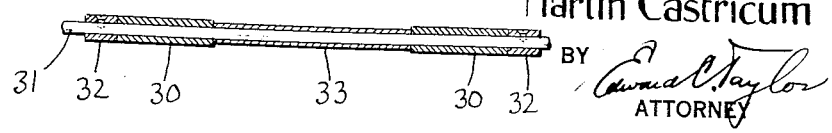
INVENTOR
Martin Castricum
BY
ATTORNEY Patented July 8, 1924.

1,500,233

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

WEIGHING MOVING MATERIAL.

Application filed October 30, 1922. Serial No. 597,751.

*To all whom it may concern:*

Be it known that I, MARTIN CASTRICUM, a citizen of the United States of America, residing at Springfield, in the county of Hampden and State of Massachusetts, have invented certain new and useful Improvements in Weighing Moving Material, of which the following is a specification.

My invention relates to improvements in the weighing of moving sheet material. It has for its object the provision of a method and an apparatus for weighing sheet material, such as rubberized fabric or newly formed paper, without requiring the stoppage of the material and without relation to the speed with which it is moving. It has for a particular object the improvement of prior devices of this kind whereby accurate weights may be obtained of a unit area of material, irrespective of the width of the material or the fact whether such width is constant or varying. It has for a further object the provision of means whereby unit weights of the moving fabric may be taken at different portions of its width, and whereby the lateral position at which the weight is to be determined may be varied without stopping the apparatus and without complicated mechanism. It has for a further object the provision of an improved method whereby unit weights of moving material may be determined. It has other and further objects which will appear from the following description and claims.

The invention will now be described with reference to the accompanying drawings, in which—

Fig. 1 is a side elevation showing a sheet of material fed from a rubberizing calender, and the general arrangement of mechanism for determining weights of the moving sheet;

Fig. 2 is a plan view of a portion thereof;

Fig. 3 is a partial section taken generally on line 3—3 of Fig. 1;

Fig. 4 is a section on line 4—4 of Fig. 3; and

Fig. 5 is a detail of a modification.

In the manufacture of sheet goods, such as the rubber-coated fabric used in the manufacture of automobile tires, it has been proposed to weigh the material continuously by means of floating rollers (as will be described below) as the material is delivered from the rubber-coating calender. The material, particularly if it be of certain types used in the manufacture of tires, varies in width to a considerable extent, and as the prior methods of weighing gave the weight of a unit length of the sheet, such figures were unreliable for purposes of determining the true weight per square unit such as the weight per square yard. The measurements obtained are utilized immediately in correcting the amount of rubber being applied by the calender, and an error in the measurement results in an incorrect change in the amount of rubber. For example, if the fabric were running wide the prior art weighing device would indicate merely a heavy condition. If the calender man corrected this apparent condition by reducing the thickness of the rubber sheet being applied by the calender, the weight per square yard might be reduced below the allowable limit of tolerance, resulting possibly in the necessity of scrapping a considerable part of the run. These prior methods, while giving good results on material of uniform width, failed to give accurate indications where the width varied. By my invention I change these prior methods so as to make them give accurate results when used with material of varying widths. Thus, instead of giving weights per unit length of material, my improvement indicates directly the weight of a definite area, such as a square yard or a square meter. The term "unit width" is used to indicate the width of fabric that must rest upon the weighing apparatus to give the proper scale reading for the unit of area chosen.

First let me describe that part of the weighing mechanism which I employ in common with prior devices. I have shown the material 10 as being fed from a conventional rubber-coating calender 11, although the invention is not restricted to use in connection with the rubber industry but may find application in any field where moving sheet material is to be weighed. The material passes over an idler roll 12, over a supporting or scale roll 13, and around an idler roll 14. From that roll it passes over a second scale roll 15, around an idler roll 16, and finally over an idler roll 17 to any desired point. The reverse passage of the material is not necessary but increases the accuracy of the device by giving more material to weigh. No matter at what speed the material is moving, the length between rolls 12 and 14 and between 14 and 16 is always constant, and therefore, if the weight (and width) is uniform, the weight of fabric resting on the scale rolls 13 and 15 will always be constant. The scale rolls are supported from a common scale arm which can be counterbalanced for the standard weight desired, and variations from this standard detected by an indicator 18 actuated by the scale mechanism.

The scale as thus far described will indicate variations in weight of the total width of the material, but will not show the influence of variations in this width. I have found that by supporting portions of the material clear of the scale rolls, the effect of material of constant width will be obtained. It is desirable in some instances to vary the width of material being weighed, and in other instances to weigh the material adjacent its two edges separately, to see whether the material is running of uniform weight from one side to the other. The mechanism which I prefer for this purpose has this adjustable feature, although non-adjustable supporting devices may be used if desired.

Extending between side frames 19, which carry the scale mechanism, are angle irons 20, one adjacent scale roll 13 and one adjacent roll 15. These angles are preferably carried on adjusting screws 21 at each end, so that they may be given a slight vertical permanent adjustment to set them accurately at the proper elevation with respect to the rolls. Pivoted at 22 to these angles are plates 23, conveniently having operating handles 24. As appears from Fig. 4, the tops of these plates when in vertical position are slightly above the level of the scale rollers so that, when the fabric or other material is passing as indicated in Fig. 1, it will be held out of contact with the rolls at the points where the plates are raised.

If it is desired to weigh that portion of the fabric at the center, all the plates 23 are raised, except those at the center, sufficient to furnish the width desired. This arrangement will restrict the weight of fabric resting on the rolls to that corresponding to the width between the raised plates. As shown in Fig. 3, the end plates only are raised, the central four being down. If the plates are, for example, twelve inches wide, this will allow for a width of substantially forty-eight inches resting on the scale rolls and being weighed thereby. If the overall width of the material varies somewhat during the running, it will make no difference, as the edge portions are at all times held off from the scale rolls and only a constant width in the center is being weighed. If it is desired to weigh the material at one side or the other of the center, as for example, to determine whether or not the fabric is running uniform throughout its width, this can be readily accomplished by raising all the plates but those at the side where the weight is desired.

If adjustability is not desired, a construction such as shown in Fig. 5 may be used. In this case the raised plates are replaced by rollers 30 supported on a rod 31 suitably mounted in the stationary frames 19, and held in place by collars 32 and a spacing sleeve 33. The rollers 30 perform the same functions as the raised plates, while the spacing sleeve, being of lesser diameter, permits the fabric at this point to sag into contact with the scale rollers.

Having thus described my invention, I claim:

1. A method of weighing a unit area of moving flexible material which comprises passing the material over a support attached to a weighing apparatus with a unit width of the material resting upon the support, and preventing contact of the remaining width of the material with the support.

2. In an apparatus for weighing a unit width of moving sheet material, a weighing apparatus, a support attached thereto over which the material is adapted to pass and through which the weight of the material is transmitted to the weighing apparatus, and a device for holding out of contact with the support all but a unit width of the material.

3. In an apparatus for weighing a unit width of moving sheet material, a weighing apparatus, a support attached thereto over which the material is adapted to pass and through which the weight of the material is transmitted to the weighing apparatus, and a device for holding portions of the material out of contact with the support, said device being adjustable to permit different portions of the material being weighed.

4. In an apparatus for weighing a unit width of moving sheet material, a weighing apparatus, a support attached thereto over which the material is adapted to pass and through which the weight of the material is transmitted to the weighing apparatus, and a series of plates located adjacent the support and adapted to be moved individually into positions supporting the material out of contact with the support.

5. In an apparatus for weighing a unit width of moving sheet material, a weighing apparatus, a support attached thereto over which the material is adapted to pass and through which the weight of the material is transmitted to the weighing apparatus, and a series of separately hinged plates located adjacent the support and adapted to be swung individually into positions supporting the material out of contact with the support and to be held in such positions by the friction of the moving material.

MARTIN CASTRICUM.